Patented Aug. 17, 1954

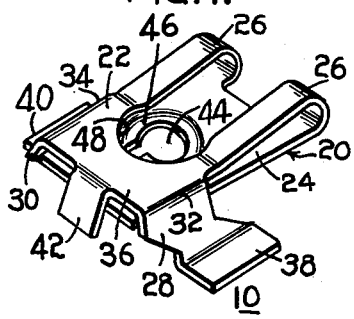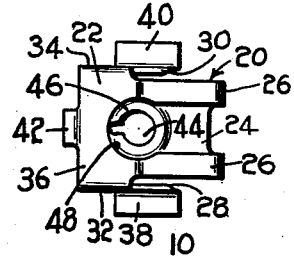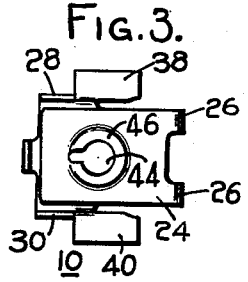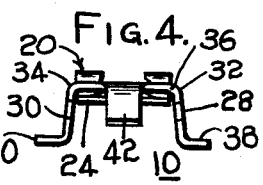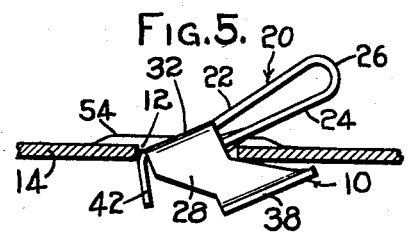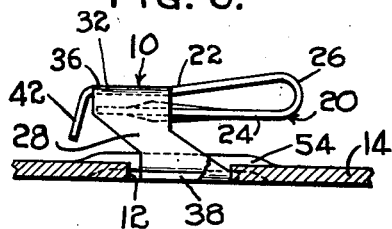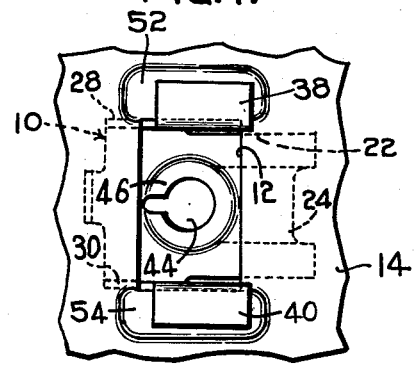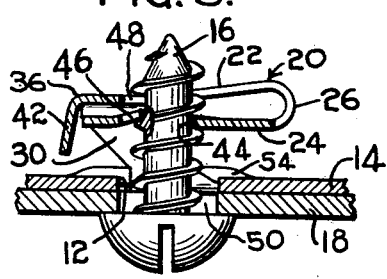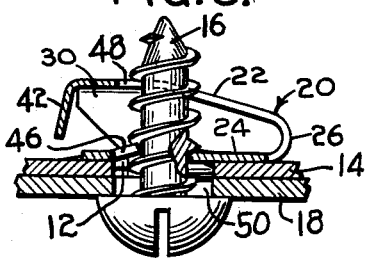

2,686,548

UNITED STATES PATENT OFFICE 2,686,548

NUT RETAINER DEVICE

Howard J. Murphy, Lynnfield, Mass., assignor to United-Carr Fastener Corporation, Cambridge, Mass., a corporation of Massachusetts Application March 29, 1951, Serial No. 216,530

3 Claims. (Cl. 151—41.75)

This invention relates generally to fastening devices, and has particular reference to a fastener-engaging device for assembly into an opening in a supporting panel.

The object of the invention is to provide a sheet metal fastener-receiving device for assembly into an opening in a supporting panel to receive a threaded fastener for engagement therewith.

A further object of the invention is to provide a fastener-receiving device which is adapted for assembly into an opening in a panel from the front side thereof so that the fastener-engaging portion is disposed behind the panel.

Another object of the invention is to provide a one-piece sheet metal fastener-receiving device in which a base which is adapted to be passed endways through a panel opening from the front of the panel and tilted into substantially parallel spaced relation to the panel is provided with means for engagement with both sides of the panel and means for engaging an inserted threaded member which is movable relative to the base to be pulled against the rear of the panel when the threaded member is tightened therein.

Other objects of the invention will, in part, be obvious, and will, in part, appear hereinafter.

In the drawing:

Fig. 1 is a perspective view of a fastener-engaging device embodying the features of the invention;

Fig. 2 is a top plan view of the device of Fig. 1;

Fig. 3 is a bottom plan view of the device of Fig. 1;

Fig. 4 is a view of the device of Fig. 2 as seen from the left side;

Fig. 5 is a view in elevation, partly in section, illustrating the method of assembling the device into an opening in a supporting panel;

Fig. 6 is a view in elevation, partly in section, illustrating the fastener-engaging device after assembly into the opening in the panel;

Fig. 7 is a view of the assembly of Fig. 6 as seen from the front of the supporting panel;

Fig. 8 is a view in elevation, partly in section, of the assembly of Fig. 6 illustrating the first step in assembling a fastening member into the device from the front of the panel;

Fig. 9 is a view similar to Fig. 8 in which the fastening member has been completely assembled with the device.

Referring to the drawing, there is illustrated a fastener-receiving device 10, which is adapted to be assembled into a rectangular opening 12 in a supporting panel 14, to receive and engage a threaded fastener 16 for securing an outer panel 18 to the panel 14.

The device 10 is preferably formed of a single piece of sheet metal bent to form a panel-entering portion 20 for passing through the opening 12 during assembly. The portion 20 comprises a base portion 22 and a fastener-engaging plate 24 which are superimposed on each other, but not necessarily in face to face contact, and are joined at a reverse bend portion 26 so that they are movable away from each other about said reverse bend portion 26. The panel-entering portion 20 formed by the base 22 and the plate 24 is more or less rectangular in plan view and has a width slightly less than the longer dimension of the opening 12, and a length considerably greater than the shorter dimension of the opening 12, so that the portion 20 may be inserted endways through the opening during assembly, as will be hereinafter described.

A pair of legs 28 and 30 are provided on the base, which are joined on thereto at opposite sides 32 and 34 near one end 36 of the base and extend outwardly from the plane of the base on opposite sides of the plate 24 to terminate in panel-bearing feet 38 and 40 which extend in opposite directions from the ends of the legs. The legs 28 and 30 are so shaped that their axis is generally inclined in relation to the base, so that the panel-bearing feet 38 and 40 are disposed generally opposite the medial portion of the sides 32 and 34 of the base (see Figs. 1 and 2). The base 22 is also provided with a spring spacing tongue 42 which extends from the end 36 of the base past the end of the plate 24.

To provide means for engagement with a threaded fastener, the plate 24 is provided with a centrally located opening 44 having a helical thread 46 formed in the surrounding edge. The base 22 is provided with an aperture 48 sufficiently large to permit the end of a threaded fastening device to pass therethrough without interference.

The method of assembly of the device is best illustrated by reference to Fig. 5. The panel-entering portion 20 is inserted endways into the opening until the legs 28 and 30 contact the edge of the panel. The device 10 is then tilted relatively to the panel so that the end 36 of the base passes through the opening. When the device is tilted further to bring the base into substantially parallel spaced relation to the rear side of the panel, the spring tongue 42 also passes through the opening and snaps past the adjacent edge to pass behind the panel, and the feet 38 and 40 may then be forced against the panel on opposite sides of the opening 12. As shown in Fig. 6, the spring spacing tongue 42 need not be sufficiently long to butt against the rear face of the panel when the feet 38 and 40 are bearing against the panel. If it is sufficiently long to snap past the panel edge, it will prevent accidental removal of the fastener from the opening prior to assembly of the second panel 18, since to accomplish such removal, the tongue must be deflected inwardly toward the opposite end of the base to allow the end thereof to clear the panel edge.

To assemble the second panel 18, said panel is placed against the supporting panel 14, with an opening 50 therein aligned with the opening 12 in the supporting panel. A threaded fastening device 16 such as a screw or the like is inserted through the openings in both panels and turned into engagement with the helical thread 46 in the plate 24.

As the screw is tightened therein, the plate 24 is drawn against the inner face of the panel 14, so that the panels are retained tightly together. The base 22 is retained in its original position by the legs 28 and 30, since the feet 38 and 40 are confined between the panels 14 and 18.

If it is desired that there be no space between the panels after tightening, a pair of embossments 52 and 54 may be provided in the panel 14 on opposite sides of the opening to receive the feet 38 and 40, which embossments are sufficiently deep to compensate for the thickness of the feet.

Since certain obvious modifications may be made in the device without departing from the scope of the invention, it is intended that all matter contained herein be interpreted in an illustrative and not in a limiting sense.

I claim:

1. A one-piece fastener-engaging device for assembly into an opening in a panel from the outer face thereof so that the fastener-engaging portion is disposed behind the panel, said device comprising a base plate and fastener-engaging plate return bent and superposed thereto, said plates being joined to one another at one end only so as to be movable relative to each other about said joining end as a fulcrum, said plates being adapted to be inserted endways, fulcrum end first, through the panel opening and tilted into substantially parallel spaced relation to the panel, said base plate having a pair of panel-engaging legs joined to opposite sides thereof at the end of the base plate away from said first end which legs extend outwardly from the plane of the base plate in the same direction, said legs having bearing portions formed on the ends thereof which extend outwardly in opposite directions to bear against the outer face of the panel on opposite sides of the opening, said legs having portions of both edges inclined relative to the base plate toward the fulcrum end, each bearing portion being disposed substantially opposite the mid-point of the side of the base plate to which the leg is joined, both ends of said base plate extending laterally beyond each bearing portion; said fastener-engaging plate having integral fastener engaging means thereon substantially overlying the space between the bearing portions, said fastener-engaging means being normally spaced from the bearing portion at a distance greater than the thickness of the panel said base plate being perforated axially of the fastener-engaging means.

2. A one-piece fastener-engaging device in accordance with claim 1 in which the base plate and the fastener-engaging plate are resiliently joined to one another at one end only.

3. A one-piece fastener-engaging device in accordance with claim 1 in which a spring spacing arm is joined to the end of the base plate between the legs at the end opposite to the fulcrum end.

References Cited in the file of this patent

UNITED STATES PATENTS

| Number | Name | Date |
|---|---|---|
| 991,447 | Kennedy | May 2, 1911 |
| 2,040,374 | Grimes | May 12, 1936 |
| 2,244,823 | Burke | June 10, 1941 |
| 2,283,122 | Murphy | May 12, 1942 |
| 2,378,258 | Tinnerman | June 12, 1945 |
| 2,430,555 | Burke | Nov. 11, 1947 |
| 2,552,782 | Hall | May 15, 1951 |
| 2,562,002 | Tinnerman | July 24, 1951 |
| 2,612,927 | Aylor | Oct. 7, 1952 |
| 2,635,666 | Murphy | Apr. 21, 1953 |